United States Patent [19]
Russo

[11] Patent Number: 5,653,004
[45] Date of Patent: Aug. 5, 1997

[54] PLASTIC CLIP

[76] Inventor: Michael T. Russo, 1139 Meadowglen Ct., Bloomfield Hills, Mich. 48304

[21] Appl. No.: 650,053

[22] Filed: May 16, 1996

Related U.S. Application Data

[63] Continuation of Ser. No. 442,289, May 16, 1995.

[51] Int. Cl.⁶ .................... A44B 21/00; A43C 11/00
[52] U.S. Cl. .................... 24/575; 24/576; 24/578
[58] Field of Search ................ 24/575, 576, 577, 24/578, 579.1, 590, 508, 511, 529, 457, 557, 587

[56] References Cited

U.S. PATENT DOCUMENTS

| | | | |
|---|---|---|---|
| 2,354,485 | 7/1944 | Slaughter | 24/578 |
| 4,236,283 | 12/1980 | Marosy | 24/590 |
| 4,246,679 | 1/1981 | Monett | 24/590 |
| 4,690,288 | 9/1987 | Mitchell . | |
| 4,807,334 | 2/1989 | Blanchard | 24/557 |
| 4,839,947 | 6/1989 | Cohen et al. | 24/557 |
| 5,159,730 | 11/1992 | Radvin | 24/557 |
| 5,187,843 | 2/1993 | Lynch | 24/576 |
| 5,208,952 | 5/1993 | Mintel et al. | 24/575 |

FOREIGN PATENT DOCUMENTS

| | | | |
|---|---|---|---|
| 1008818 | 5/1952 | France | 24/590 |
| 1202080 | 1/1960 | France | 24/576 |
| 2062852 | 7/1972 | Germany | 24/575 |
| 0304694 | 4/1955 | Switzerland | 24/557 |
| 0566419 | 9/1975 | Switzerland | 24/557 |

*Primary Examiner*—Victor N. Sakran
*Attorney, Agent, or Firm*—Rader, Fishman & Grauer PLLC

[57] ABSTRACT

A clip comprising a bight portion separating first and second handle portions. The handle portions terminate in grip portions having teeth disposed on an outer surface thereof. In one preferred embodiment, the teeth form an acute angle with an outer surface of the grip portion thereby giving the clip superior resistance against pulling apart engaged with a clip of like design.

4 Claims, 2 Drawing Sheets

PLASTIC CLIP

This application is a continuation of Ser. No. 08/442,289 filed Jun. 16, 1995.

TECHNICAL FIELD

This invention relates to clips and more particularly relates to light duty plastic clips.

BACKGROUND OF THE INVENTION

Clips and clip-like devices are well-known and are employed in any number of applications where fastening needs arise. For example, banks, movie theaters, and the like use plastic chain and associated attachment clips for directing the formation of customer lines. Also, plastic chain is used in landscaping applications, supporting light fixtures and potted plants, and supporting other relatively light articles.

Although plastic chain enjoys wide use, there has heretofore been only a limited number of connectors or clips used for joining the end segments of chains for suspending items from the chains. Each of these clips has had its own drawbacks and accordingly none have been totally satisfactory.

It is an object of this invention to provide a clip which is inexpensive to manufacture, is easily adapted to use with chain link which provides excellent retention qualities.

SUMMARY OF THE INVENTION

The clip of the present invention comprises a body portion which includes first and second handle portions separated by a bight portion. The first handle portion terminates into a first grip portion and the second handle portion terminates into second and third spaced grip portions. The first grip portion is aligned between said second and third grip portions such that when the handle portions are moved toward each other the grip portions move along respectively associated planes wherein the first grip portions plane of movement is located between, and parallel to, the plane of movement of the second and third grip portions.

Preferably, at least some of the grip portions include teeth extending from an outer surface of said grip portion and preferably at least some of the teeth define an acute angle between a surface of said tooth and an outer surface of said grip portion.

Preferably, the clip includes a relaxed position wherein the grip portions assume a positive center of actuation when said clip is in said relaxed position.

To enhance the ease of handling and actuating the clip, preferably the first and second handle portions include raised grip surfaces.

DETAILED DESCRIPTION OF THE PREFERRED EMBODIMENT

Figure 1:
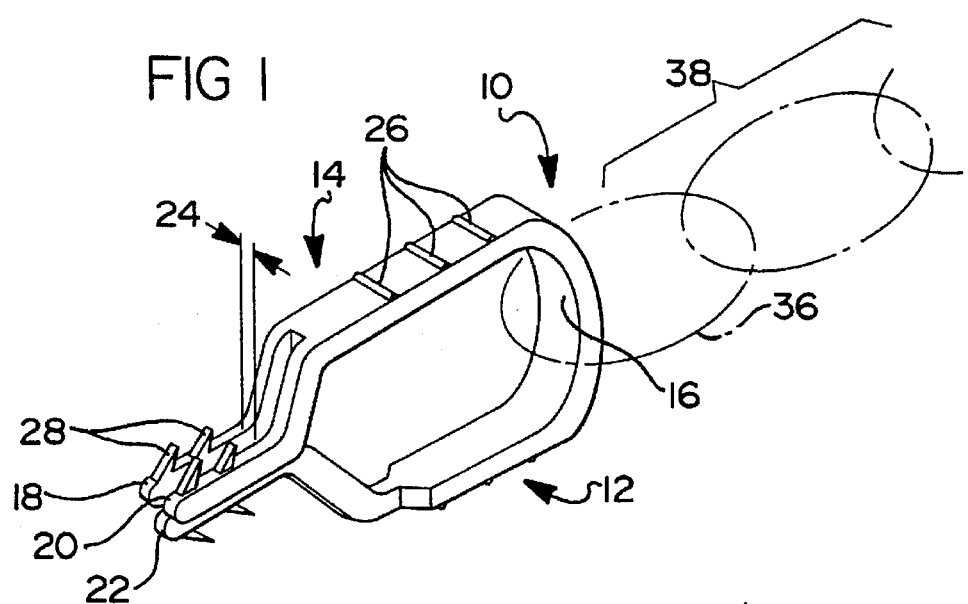
FIG. 1 is a perspective of the clip of the present invention.

Now referring to FIG. 1, clip 10 (shown in its relaxed position) includes first handle portion 12, second handle portion 14, and bight portion 16 which connects first and second handle portions 12, 14. First handle portion 12 terminates into a first grip portion 22 and second handle portion terminates into second and third grip portions 18, 20 respectively. Second and third grip portions 18, 20 are spaced apart 24 such that when first and second handle portions 12, 14 are squeezed together, first grip portion 22 freely passes between second and third grip portions 18, 20.

Preferably, first and second handle portions 12, 14 include engagement surfaces 26 which ease in the handling and manipulation of clip 10.

Preferably, clip 10 is comprised of plastic and is formed from the injection molding process.

Figure 2:
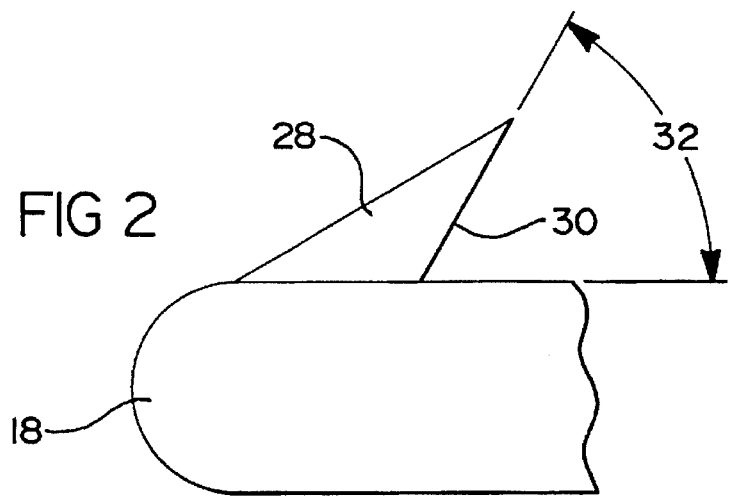
FIG. 2 is a partial enlarged view of a tooth extending from an outer surface of a grip portion.
Figure 3:
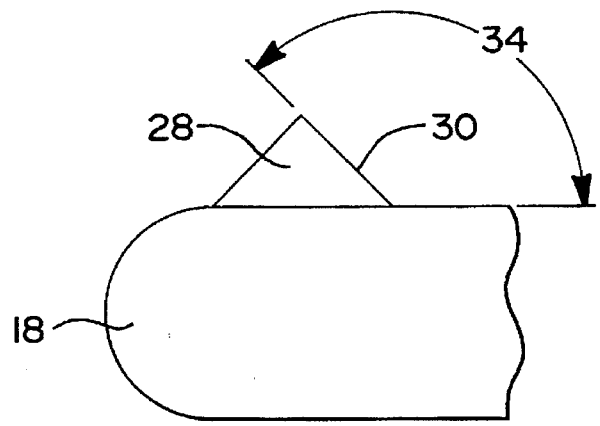
FIG. 3 is an alternative embodiment of a tooth extending from an outer surface of said grip portion.

Now referring to FIGS. 2 and 3, one preferred embodiment of teeth 28 is shown in FIG. 2 wherein an inner surface 30 of tooth 28 forms an acute angle 32 with the surface of second grip portion 18. A second embodiment of tooth 28 is shown in FIG. 3 wherein inner surface 30 of tooth 28 forms an obtuse angle 34 with an outer surface of second grip portion 18. Even though FIGS. 2 and 3 only depict second grip portion 18 having the preferred tooth geometries, these geometries are also contemplated for use with third grip portion 20 as well as first grip portion 22.

It can be easily seen from FIGS. 1-3 that the clip of the present invention is particularly adapted to engaging a link 36 of chain segment 38 and grip portions 18-22 are adapted for clamping onto fabric, cardboard or any other article. Engaging link 36 is accomplished by spreading first and second handle portions 12, 14 and inserting one of the handle portions through the opening in link 36. Moreover, clip 10 is adapted to engage a clip of similar construction and exhibits superior retention qualities. This feature of the present invention will now be explained in conjunction with FIGS. 4-6.

Figure 4:
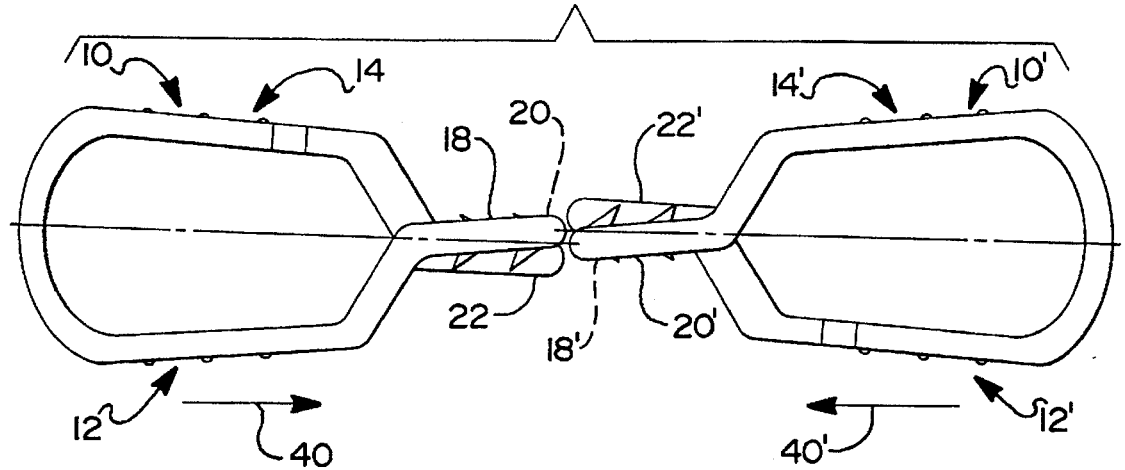
FIGS. 4-6 disclose the positive center of actuation feature of the clip of the present invention.
Figure 5:
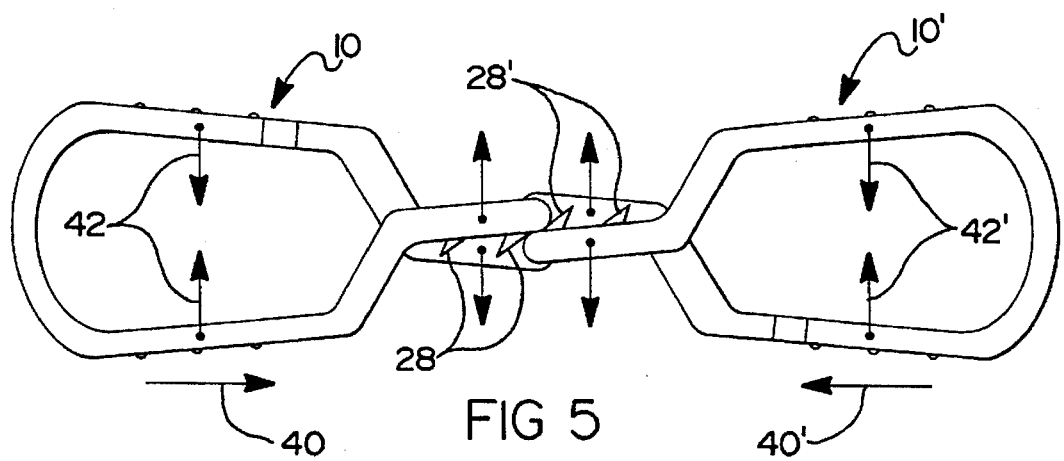
Figure 6:
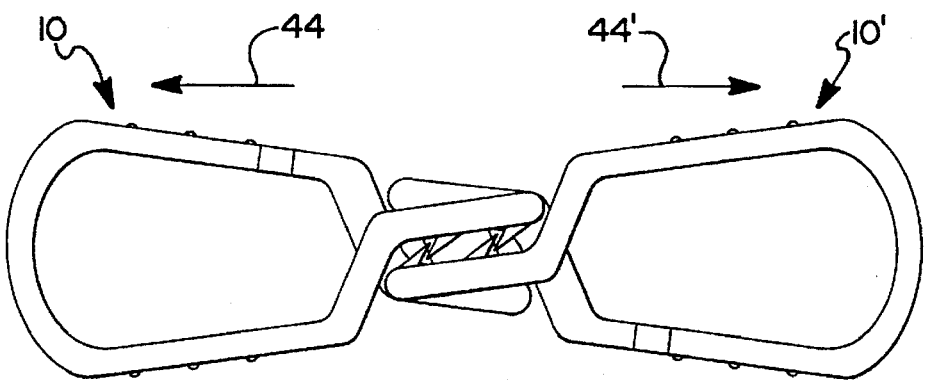

Now referring to FIGS. 4-6, in its preferred embodiment, clip 10 is formed such that when first and second handle portions 12, 14 are not compressed (or are in their relaxed position as shown in FIG. 4) first grip portion 22 extends slightly below second and third grip portions 18, 20. This relation between first, second, and third grip portions is noted herein as a positive center of actuation. By assuming a positive center of actuation when the clip of the present embodiment is in the relaxed state, a second clip 10' can be positively engaged to clip 10 simply by orienting the grip portions 18' through 22' of clip 10' as shown in FIG. 4 and moving 40, 40' the clips 10, 10' toward one another. When this alignment is made and movement 40, 40' begins to take place, paired grip portions 18, 18', 20, 20' and 22, 22' engage one another and force their respective first and second handle portions to move toward one another 42, 42' (see FIG. 5).

Once the two clips 10, 10' can no longer be moved toward one another any further 40, 40' the mating teeth 28, 28' engage one another and offer superior pull apart strength 44, 44'. This superior pull apart strength is primarily due to the acute angle of teeth 28, 28' and the way that teeth 28, 28' having this acute angle engage one another along their inner surface 30. The engagement properties of the clip of the present invention is so great that, when engaged with a like clip, teeth 28, 28' will sheer or break before clips 10, 10' will disengage. Of course, clips 10, 10' may be easily disengaged by simply compressing 42, 42' handle portions and withdrawing, 44, 44' clips 10, 10' away from one another.

In view of the above, it is easily seen how the design of the present invention easily accomplishes the objects of the invention. It is recognized that those skilled in the art may make various modifications or additions to the preferred embodiments chosen here to illustrate the present invention without departing from the spirit of the present invention. Accordingly, it is to be understood that the subject matter sought to be afforded protection hereby should be deemed to extend to the subject matter defined in the appended claims, including all fair equivalents thereof.

I claim:

1. A clip, comprising:

a body including a bight portion connected to and separating first and second handle portions, said first handle portion terminating into a first grip portion and said second handle portion terminating into second and third spaced grip portions, said first grip portion aligned between said second and third grip portions wherein said handle portions are capable of moving toward each other such that when said handle portions are moved toward each other, said grip portions move along respectively associated planes wherein said first grip portion's plane of movement is located between and generally parallel to said plane of movement of said second and third grip portions; and wherein said clip includes a relaxed position and wherein said first grip portion extends slightly below said second and said third grip portions when said clip is in said released position to provide a positive center of actuation.

2. The clip of claim 1, wherein at least some of said grip portions include teeth extending from an outer surface of said grip portion.

3. The clip of claim 2, wherein at least some of said teeth define an acute angle between a surface of one of said teeth and an outer surface of said grip portion.

4. The clip of claim 1 further including raised engagement portions along said first and second handle portions.

* * * * *